Patented Feb. 10, 1931

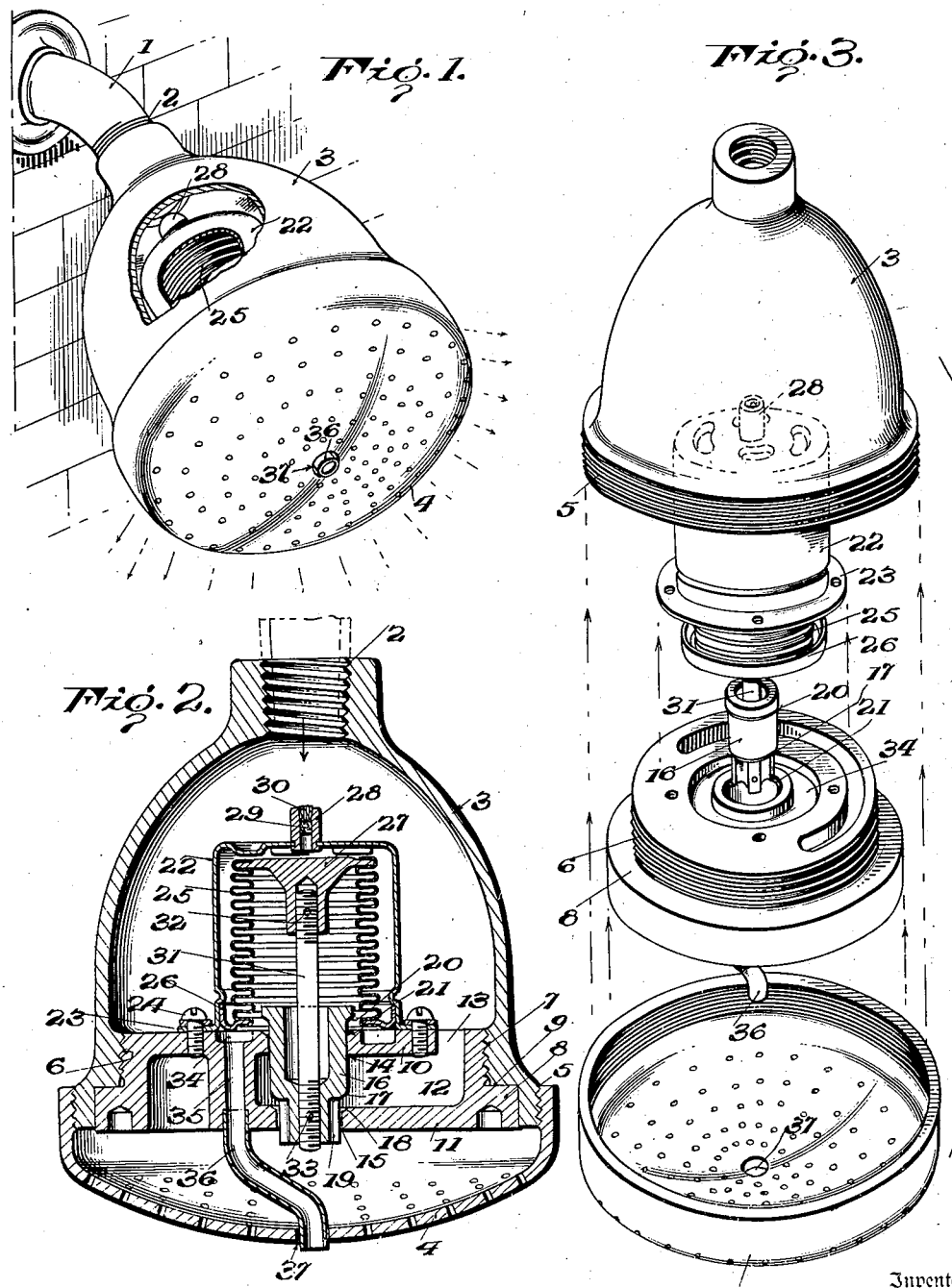

1,791,811

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

SHOWER HEAD

Application filed December 29, 1927. Serial No. 243,404.

This invention relates to shower heads of the type wherein the discharge of fluid from the shower head is controlled in accordance with the temperature of the fluid.

It has been proposed heretofore to provide shower heads and similar devices with suitable discharge controlling means governed, in accordance with the temperature of the fluid flowing therethrough, by suitable thermostatic control means. Such apparatus, while applicable to a variety of uses, is generally most useful in conjunction with shower heads for bathing purposes, in which case the function may be to prevent a discharge from the shower head which is of extreme temperature. For example, particularly where steam and water mixing devices are used to supply hot water to the shower, extreme variations in the temperature of the water are apt to occur and to cause considerable discomfort to the bather, which at times may even amount to actual scalding. It is therefore desirable in such cases to provide a thermostatically controlled means which will cut off the discharge of water from the shower head when the temperature thereof reaches a predetermined maximum.

In general, apparatus heretofore employed for this purpose comprises a discharge controlling valve of some kind, which valve is operated by a thermostatic control such as a bellows-type thermostat. If such a device is to subserve its intended purpose, it must have the characteristics of positive operation at a definite predetermined temperature, unaffected by the variations in the pressure of the water supplied to the device or of the surrounding atmosphere; freedom from all tendency of the moving parts to stick under varying conditions such as expansion or contraction, bending, twisting or binding strains on the moving parts, rust, dirt, etc.; durability and economy of construction; etc.

One of the objects of the present invention is generally to provide a novel and improved thermostatically controlled shower head or like device having to the highest possible degree the above-mentioned desirable characteristics.

Another object is to provide a device of this type wherein the thermostatic element is effectively shielded from the influence of external pressure variations of any kind.

A further object of the invention is to provide novel and improved means for guiding and controlling the movement of the moving elements of the device, whereby the operation thereof is rendered more sure and certain and the possibility of sticking or binding of the moving elements is decreased to a minimum.

Other objects will appear hereinafter as the description of the invention proceeds.

One embodiment of the invention has been illustrated in the accompanying drawings, but it is to be expressly understood that said drawings are for purposes of illustration only and are not to be construed as defining the limits of the invention, reference being had to the appended claims for this purpose.

In the drawings,

Fig. 1 is a perspective view of a shower head constructed according to the invention;

Fig. 2 is a sectional view of Fig. 1; and

Fig. 3 is a view showing the various parts of the device and their relation to one another.

Referring now to the drawings, wherein like reference characters indicate like parts throughout the several views, the shower head is shown connected to and supported from the usual water supply pipe 1, the end of said pipe being threaded as at 2 for this purpose. The shower head comprises the usual or any suitable hollow body 3, which is preferably of metal and as shown is screwed on the threaded end 2 of the pipe 1. The water entering through the pipe 1 is discharged from the shower head through a perforated cap 4 of any suitable type, which is preferably screw threaded on the body 3 as at 5.

Suitable means are provided within the body 3 for controlling the discharge of the water from the shower head, such means preferably comprising an opening for the passage of the water therethrough, which opening is controlled by a thermostatically operated valve of any suitable type. To this end, the body 3 is preferably provided with a suitably supported partition in which the valve opening is formed, such partition in the form shown comprising a disk-like member 6 supported in the body 3 by means of threaded engagement therewith at 7 and having a shoulder 8 seated in a cooperating recess 9 formed in the body 3.

For the purpose of supporting and guiding the valve and its operating mechanism, the partition member 6 preferably comprises a pair of spaced parallel walls having a space therebetween to which water is suitably admitted from the pressure side thereof, said walls having a pair of alined openings in one of which the valve member or suitable guide means therefor, is slidably mounted to cooperate with said other opening to control the discharge of water through the shower head. Referring now to Fig. 2, the partition member 6 comprises two substantially parallel walls 10 and 11, forming therebetween a space 12 to which water is admitted through a suitable opening 13. The opening 13, may as shown in Fig. 3, comprise a cresent-shaped slot in the wall 10 constituting the pressure side of the partition, which slot is concentric with the disk-like member and adjacent the periphery thereof.

The walls 10 and 11 are provided with alined central openings 14 and 15 respectively, the opening 15 serving to allow water from the space 12 to escape to the perforated cap 4, and the opening 14 serving as a suitable guide for the movable valve member which is operated to close the opening 15. The valve employed may be of any suitable type, and preferably comprises a valve member 16, shaped to fit tightly in the opening 14 but slidable therein, said member having a valve surface 17 adapted to cooperate with a valve seat 18 formed at the edge of the opening 15. The valve member 16 is reduced in size beyond the valve 17 in order to pass freely through the opening 15 and to allow water to escape therethrough, and may if desired, be provided with wings 19 to guide the same in its movement through the opening 15. The valve member 16 may be enlarged at its other end to provide a second valve surface 20 cooperating with a valve seat 21 formed on the edge of the opening 14, which valve surface and seat prevent water from leaking back through the opening 14 when the valve 17 is closed and the space 12 is under pressure.

Generally speaking, any suitable type of thermostatic control for actuating the valve 16 may be employed, and in conjunction therewith suitable means are provided for shielding the thermostatic element from the effect of pressure variations of the water supplied to the device while at the same time subjecting said element to the temperature of the water so supplied. To this end, as illustrated in the drawings, said thermostatic means takes the form of a collapsible and expansible vessel, charged with a temperature-responsive fluid, and comprising a substantially rigid outer wall in contact with the water flowing through the shower head, and a collapsible and extensible inner wall which is operatively connected with the valve member 16. Referring again to Fig. 2, the outer wall of the thermostatic vessel is constituted by a thin but substantially rigid cup 22, preferably of metal, which may be suitably supported from the partition member 6 as by means of a flange 23 and screws 24. The space within the cup 22 and the partition member 6 is thus sealed against the admission of water by the flange joint, and by the tight sliding fit between the member 16 and the opening 14, and by the further provision of the valve 20 and its seat 21 which are operative when the valve 17 is closed. Within the cup 22 is a corrugated collapsible and extensible wall 25, preferably of resilient metal. The wall 25 is connected to the rim of the cup 22 in any suitable manner, preferably being attached to a head 26 which is in turn attached to the inside rim of the cup 22, both by suitable means such as soldering or brazing. The other end of the wall 25 is secured in any suitable manner, as by soldering or brazing, to a head 27. The head 27, wall 25, head 26, and cup 22 thus constitute a fluid tight vessel, which may be charged with a thermostatic fluid of a character dependent on the temperature at which it is desired to operate the valve member 16. For thus purpose the cup 22 is provided with a filling plug 28 having an opening therethrough which may be sealed after filling by a cork 29 and solder 30.

The head 27 is operatively connected with the valve member 16 by suitable means such as a rod 31, threaded at both ends into the head 27 and valve member 16 and prevented from turning therein by pins 32 and 33.

To provide for the escape of any moisture which may collect within the space enclosed by the wall 25 and the partition wall 10, and in order to maintain atmospheric pressure within this space at all times, a suitable drain and pressure relief conduit is provided connecting said space with the discharge side of the shower head. In the form shown, the wall 10 of the partition member is provided with an annular well 34 to collect any moisture from within the space, and the well 34 is connected by means of a conduit 35 extending through the partition member to the discharge side thereof. Preferably, and as shown, the conduit 35 is extended by a pipe 36 leading to a hole 37 in the center of the perforated cap 4, whereby water or moisture draining out through the conduit 35 and pipe 36 will be discharged from the center of the shower head.

The operation of the device will now be apparent. The thermostatic vessel is first charged with a thermostatic fluid through the opening in the filling plug 28, which is then closed by the cork 29 and solder 30. The device is then assembled and installed as shown in Fig. 1. When the water is turned on, it flows through the pipe 1 into the body 3, through the opening 13 into the space 12, and through the opening 15 and the perforated cap 4. As the temperature of the water increases, the pressure of the thermostatic fluid in the thermostatic vessel will increase correspondingly, and will tend to move the head 27 downwardly as shown in Fig. 2 to close the valve 17. When ever the temperature of the water flowing through the shower head exceeds a definite predetermined maximum, the valve 17 will be tightly closed and the escape of water from the shower head will be prevented.

It will be apparent that through the use of the outer rigid wall or cup 22 the thermostatic vessel is entirely uninfluenced by the pressure of the fluid flowing through the shower head. Furthermore, the pressure against which the movable head must act to close the valve is in all cases atmospheric pressure, uninfluenced by water pressure or conditions of flow, etc. Therefore the temperature at which the valve will be closed can be precisely predetermined with the assurance that the device will operate as designed free from all external influences.

Moreover, the moving parts of the valve mechanisms are so guided and controlled in the apparatus shown that there is practically no possibility of binding of any of the parts to prevent the operation of the valve mechanism. Furthermore, the apparatus is so designed and constructed that the sliding parts of the valve mechanism are removed from the flow of water through the shower head. In other words, the possibilities of trouble due to the collection of dirt or sediment conveyed by the water, rust, mineral deposits, and similar causes, which might seriously impair the efficiency of the device, has been decreased to a minimum. At the same time, the structure is both simple and economical to manufacture and assemble, and possesses to a high degree the desirable qualities of reliable operation and long life under continuous usage.

While only one embodiment of the invention has been illustrated and described other embodiments will now readily suggest themselves to those skilled in the art, and it will be apparent that changes may be made in the details, construction and arrangement of the several parts without departing from the spirit of the invention. Reference is therefore to be had to the appended claims for a definition of the limits of the invention.

What is claimed is:—

1. A device of the class described comprising a shower head, a partition therein having a valve opening therethrough, a valve cooperating with said opening, a cup type thermostat including a cup and a flexible wall within the same mounted on the pressure side of said partition, the cup thereof being exposed to the water pressure, and means operatively connecting said flexible wall with said valve.

2. A device of the class described comprising a shower head, a partition therein having a valve opening therethrough, a valve cooperating with said opening, an annular thermostatic vessel mounted on the pressure side of said partition and comprising a rigid cup mounted on the pressure side of said partition and enclosing therewith a space sealed against water pressure and a cooperating extensible and collapsible wall within said cup, means connecting said enclosed space with the atmosphere, and means operatively connecting said wall with said valve.

3. A device of the class described comprising a perforated shower head, a partition therein having a valve opening, an inverted cup carried by said partition on the pressure side thereof, a tubular corrugated wall within said cup, a head secured to the other end of said wall, the space between said head, wall and cup constituting a thermostatic vessel, a valve for said opening, a valve stem operatively connecting said valve and said head, and a conduit extending from the space within said wall to the atmosphere.

4. A device of the class described comprising a shower head, spaced partitions therein, alined openings in said partitions, a valve member slidably engaging the opening on the pressure side of the partitions and cooperating with the opening on the discharge side of the partitions to control the flow of fluid through the head, an inverted cup on the pressure side of the inner of said partitions and closed thereby, a corrugated wall within said cup cooperating therewith to constitute a collapsible and expansible vessel, and means operatively connecting said vessel with said valve member.

5. A device of the class described comprising a shower head, spaced partitions therein, alined openings in said partitions, a valve for the opening on the discharge side of the partitions, a valve stem extending through the other opening, guide means on said stem slidably engaging said last-named opening, an inverted cup on the pressure side of the inner of said partitions and closed thereby, a corrugated wall within said cup cooperating therewith to constitute a collapsible and expansible vessel, said valve stem being operatively connected with said vessel, and means to conduct fluid to the space between said partitions.

6. A device of the class described comprising a shower head, spaced partitions therein, alined openings in said partitions, a valve member slidably engaging the opening on the pressure side of said partitions and cooperating with the opening on the discharge side of said partitions to control the flow of fluid through the head, an inverted cup on the pressure side of said partitions, a corrugated wall within said cup cooperating therewith to constitute a collapsible and expansible vessel, means operatively connecting said vessel with said valve member, and a conduit connecting the space within said wall with the discharge side of said partitions.

7. A device of the class described comprising a shower head, spaced partitions therein, alined openings in said partitions, a valve for the opening on the discharge side of said partitions, a valve stem extending through the other opening, guide means on said valve stem slidably engaging said last-named opening, an inverted cup on the pressure side of said partitions, a corrugated wall within said cup cooperating therewith to constitute a collapsible and expansible vessel, said valve stem being operatively connected with said vessel, means to conduct fluid to the space between said partitions, and a conduit connecting the space within said wall with the discharge side of said partitions.

8. A device of the class described comprising a shower head, a partition therein having a valve opening therethrough, a valve cooperating with said opening, an annular thermostatic vessel mounted on the pressure side of said partition and including a corrugated wall and a surrounding exterior cup enclosing with said partition a space shielded from pressure variations, and means operatively connecting said vessel with said valve.

9. In a device of the class described, a shower head, spaced partitions therein enclosing a water supply space under pressure, alined openings in said partitions, a discharge valve cooperating with the opening in one of said partitions, a thermostat operatively connected to said valve, valve guide means slidably engaging the opening in the other of said partitions, and means surrounding said last named opening on the side opposite from said space and external to said space, whereby said guide means is protected from the flow of water through the shower head, said last named means providing an encasing wall for said thermostat.

In testimony whereof I have signed this specification.

JEAN V. GIESLER.